United States Patent [19]

Peppel

[11] Patent Number: 4,796,862

[45] Date of Patent: Jan. 10, 1989

[54] WINCH COMPENSATOR

[75] Inventor: George W. Peppel, Arlington, Tex.

[73] Assignee: Lockheed Corporation, Calabasas, Calif.

[21] Appl. No.: 128,990

[22] Filed: Dec. 4, 1987

Related U.S. Application Data

[63] Continuation of Ser. No. 897,722, Aug. 18, 1986, abandoned.

[51] Int. Cl.[4] .......................... B66D 1/14; F16F 1/14; F16F 1/36

[52] U.S. Cl. .................................... 254/277; 251/358; 267/153; 267/154; 267/282; 267/294; 464/88

[58] Field of Search ............... 254/277, 329, 332, 364, 254/392, 358, 900; 267/57.1 R, 57.1 A, 57, 141.1, 153, 154, 282, 294; 464/88, 92, 96; 114/230

[56] References Cited

U.S. PATENT DOCUMENTS

| | | | |
|---|---|---|---|
| 1,636,386 | 7/1927 | Oberreich | 267/154 X |
| 2,051,735 | 8/1936 | Michelson | 242/107.11 |
| 2,167,508 | 7/1939 | Herold | 267/57.1 R X |
| 2,203,342 | 6/1940 | Sloman et al. | 267/57.1 A |
| 2,386,086 | 10/1945 | Beebe | 254/376 X |
| 2,582,987 | 1/1952 | Hagenbook | 254/364 |
| 2,952,236 | 9/1960 | Moyes | 114/230 |
| 3,021,113 | 2/1962 | Kinnison | 254/374 |
| 3,083,065 | 3/1963 | Hinks et al. | 267/57.1 R X |
| 3,126,070 | 3/1964 | Hayek | 267/153 X |
| 3,353,792 | 11/1967 | Aitken | 254/364 |
| 3,385,252 | 5/1968 | Sekkelsten | 114/230 |
| 3,422,783 | 1/1969 | Moulin | 114/230 X |
| 3,511,492 | 5/1970 | Galbato | 267/57.1 R X |
| 3,557,573 | 1/1971 | Hä464 | 91 X/ |
| 3,673,813 | 7/1972 | Wright | 464/90 X |
| 3,886,887 | 6/1975 | Cunningham et al. | 114/230 |
| 4,171,920 | 10/1979 | Kramer et al. | 267/154 X |
| 4,349,184 | 9/1982 | Peterson et al. | 267/141.1 X |
| 4,480,817 | 11/1984 | Koshoji et al. | 254/332 |
| 4,496,332 | 1/1985 | Keller et al. | 464/89 |
| 4,655,433 | 4/1987 | Peppel et al. | 114/230 X |

FOREIGN PATENT DOCUMENTS

| | | | |
|---|---|---|---|
| 341420 | 8/1904 | France | 73/862.32 |

*Primary Examiner*—Joseph J. Hail, III

*Attorney, Agent, or Firm*—Eric R. Katz

[57] ABSTRACT

An improved compensating winch (10, 200) is disclosed which incorporates elastomeric elements (20, 118, 202, 204) which are deformable in torsional shear about the rotational axis of the drum of the winch to absorb shock loading of the cable (22) to increase the service life of the cable and winch and resist catastrophic failure. The elastomeric element can comprise a series of alternating elastomeric rings and rigid rings bonded together to form a unitary structure. Concentric elastomeric elements (202, 204) can be connected in a series relationship to provide for greater annular deflection of a drum versus a drive element.

12 Claims, 2 Drawing Sheets

WINCH COMPENSATOR

TECHNICAL FIELD

This invention relates to a winch for taking in and paying out a cable, and in particular to a compensator for resisting shock loading of the cable.

BACKGROUND OF THE INVENTION

Winches are used in many applications. Normally, the winch itself will be rigidly mounted on a first object, and a cable or wire of some desired length will be secured to the winch and extend to connect to a second object. By rotating the drum on the winch, the cable can be payed out or taken up on the drum as desired.

In some applications, the objects can move suddenly relative to each other, causing a shock loading in the cable. Such a shock loading can be very detrimental in terms of the service life of the equipment, and even its structural integrity. One example of such an application is a winch mounted on a fixed offshore platform to moor a supply boat. The free end of the cable from the winch is attached to a supply boat, frequently in rough seas. Since it is absolutely essential to prevent the supply boat from hitting the platform, the boat is moored downwind from the platform and the prevailing winds and current act to move the boat away from the platform, inducing a tension force in the cable. Due to wave and wind action, the cable is frequently subjected to a shock loading as the boat motion is brought up short by the cable.

In the past, compensators have been used which are actually incorporated into the cable extending between a winch and an object. Such compensators are typically hydropneumatic in operation and are therefore "active" systems which require a continuous supply of pressurized air or fluid for operation.

A need exists for an improved compensator for use in reducing shock loading on a cable taken in and payed out from a winch. Such a compensator should be reliable and preferably not require a continuous supply of high pressure hydraulic fluid or air.

SUMMARY OF THE INVENTION

In accordance with one aspect of the present invention, a winch is disclosed which has a drum for receiving a cable. Structure supports the drum for rotation about an axis. A drive element is also supported by structure for rotation about the axis. An elastomeric spring is operably connected between the drum and drive element for transmitting torque between the drum and drive element. The elastomeric spring absorbs shock loading in the cable.

In accordance with another aspect of the present invention, structure can be connected to the drive element for rotating the drum in either direction about the axis through the elastomeric spring to pay out or take in the cable from the drum.

In accordance with another aspect of the present invention, structure can be provided to stop rotation of the drive element about the axis to form a drum brake through the elastomeric spring.

In accordance with yet another aspect of the present invention, the elastomeric spring defines a cylinder comprised of alternating elastomeric rings and rigid rings bonded to form a unitary structure, a first end of the cylinder secured to the drive element and the second end of the cylinder connected to the drum.

In accordance with another aspect of the present invention, the elastomeric spring is formed of concentric elastomeric cylinders with a first end of each of the cylinders rigidly connected together in a series relationship.

BRIEF DESCRIPTION OF THE DRAWINGS

A more complete understanding of the invention can be had by referring to the following Detailed Description taken in conjunction with the accompanying Drawings, wherein.

DETAILED DESCRIPTION

Figure 1:
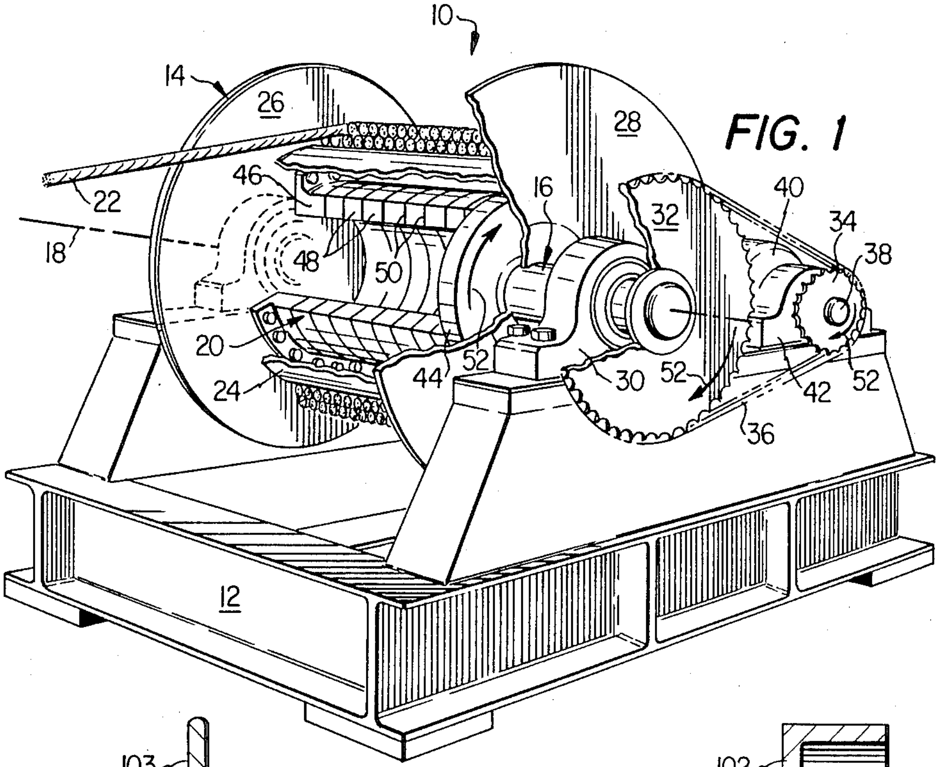
FIG. 1 is a perspective view of a winch forming a first embodiment of the present invention.

Referring now to the drawings, wherein like reference numerals designate like or corresponding parts throughout several views, and in particular to FIG. 1, there is illustrated a winch 10 forming a first embodiment of the present invention.

The winch has a base 12 which can be secured on an offshore platform or the like. The base supports a drum 14 and a drive element 16 for rotation about an axis 18. An elastomeric spring 20 is secured between the drum 14 and drive element 16 to transfer torque forces therebetween about the axis 18. A cable 22 is received on the outside of the drum 14 so that, as the drum is rotated in a given direction about the axis 18, the cable can be payed out or taken in as needed. As will be discussed in greater detail hereinafter, the use of elastomeric spring 20 provides a compensator function to winch 10 to reduce detrimental shock loading in the cable 22, both when the drum is being rotated and when the drum is stationary. A sudden increase or decrease of tension in the cable 22 will induce an annular displacement in the elastomeric spring 20 about the axis 18 to reduce the shock in the cable and thus lengthen the cable and winch service life and reliability.

The drum 14 has a cylindrical portion 24 with walls 26 and 28 extending radially outward from the ends of the cylindrical portion to confine the cable. The wall 26 has structure (not shown) mounting the drum on the base for rotation about the axis 18. The wall 28 has an aperture through its center which opens into the interior of the cylindrical portion 24 for passage of the drive element 16. Preferably, bearing structure is provided at the opening through the wall 28 so that the drive element 16 supports the drum 14 for rotation about the axis 18 at wall 28, but permits relative rotation thereof around the axis 18.

The drive element 16 is mounted for rotation about axis 18 on base 12 as by a pillow bock bearing 30. A driven gear 32 is mounted on the drive element 16 and cooperates with a drive gear 34 through a drive chain 36. The drive gear 34 is supported on a drive shaft 38 connected to a combined winch drive and brake mechanism 40. Shaft 38 is mounted for rotation about an axis parallel to axis 18 by a pillow block bearing 42. The winch drive and brake mechanism 40 is capable of rotating the drive element 16, through the various gears, in either direction about axis 18, or fixing the position of the drive element 16.

The elastomeric spring 20 has a generally cylindrical shape and is positioned to be concentric with the axis 18. The elastomeric spring 20 has a first end ring 44 which is rigidly bolted to drive element 16. At the opposite end of the elastomeric spring 20 is a second end ring 46 rigidly bolted to wall 26. Between the end rings are positioned a series of alternating elastomeric rings 48 and rigid rings 50, being bonded together to form the unitary elastomeric spring 20.

If the brake portion of the mechanism 40 has been applied to prevent motion of the drive element 16, the drum 14 will still be permitted to rotate in each direction as a result of the torsional shear in the elastomeric rings 48 of the elastomeric spring 20. For example, if the cable 22 is under tension, an increase of the tension will cause torsional shear in the elastomeric element 20 to pay more cable off the drum 14 until the torque exerted on the drive element 16 through the elastomeric spring 20 is equal to the torque exerted on the drum 14 by the cable 22. Similarly, a decrease in the tension of the cable 22 will decrease the shear of the elastomeric rings 48 until there is a torque balance. The shock loading on the cable and winch due to sudden increases or decreases in tension in the cable will be lessened by the elastomeric torsional shear in elastomeric spring 20, thereby increasing the service life of both the cable and winch and preventing possible catastrophic failure.

When cable is to be taken in, the mechanism 40 will rotate the drive element 16 in the direction of arrow 52 to induce torsional shear in the elastomeric spring 20 until the torque passing through the spring 20 to the drum 14 exceeds the tension in the cable and the frictional resistance to movement in the winch to take up the cable on the drum 14. Similarly, to pay out cable, the mechanism 40 rotates the drive element 16 in the direction opposite arrow 52, causing the drum 14 to be rotated to pay out the cable.

Figure 2:
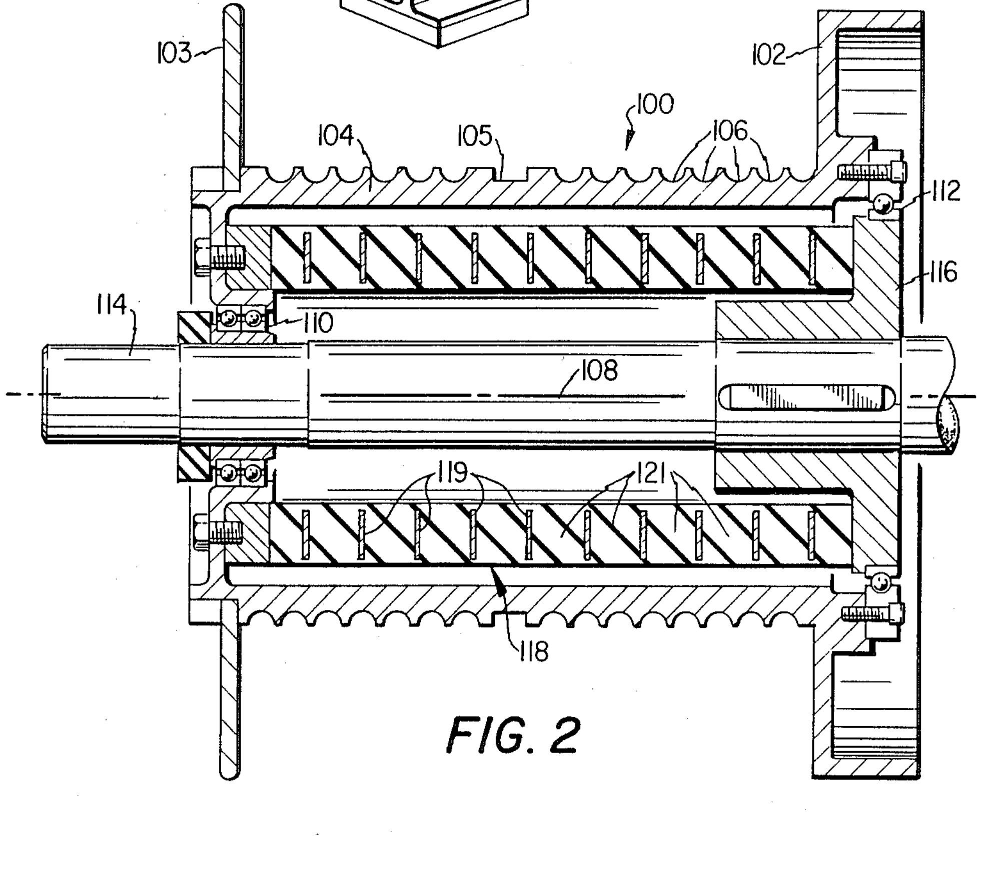
FIG. 2 is a cross-sectional side view of a first modification of the winch of FIG. 1.

FIG. 2 illustrates a first modification of the winch 10. A modified drum 100 has ring 102 formed with a cylindrical portion 104. The exterior of the portion 104 of drum 100 is formed with helical grooves 106 to receive the cable 22. The drum 100 is mounted for rotation about axis 108 through bearings 110 and 112 acting between the drum 100 and drive shaft 114. Drive shaft 114 is directly mounted to a base 12 for rotation about the axis 108. An annular plate 116 is rigidly secured on the drive shaft 114 near one end of the drum 100. An elastomeric spring 118 is secured between the annular plate 116 and a portion of the drum 100 at the end opposite the plate 116. Elastomeric spring 118 is formed of rigid plates 19 forming annular sections bonded between elastomeric rings 121. The operation of the function and method of operation of the device of FIG. 2 is essentially identical to that of winch 10 shown in FIG. 1.

Figure 3:
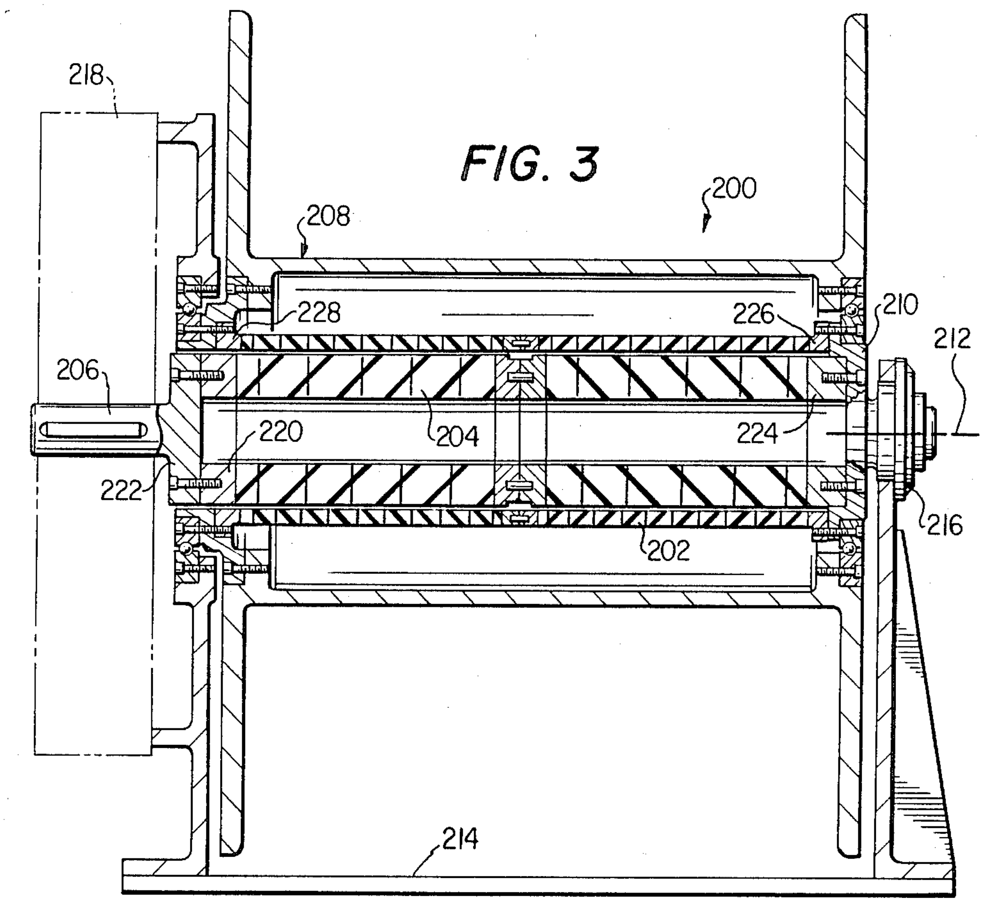
FIG. 3 is a winch forming a second embodiment of the present invention.

FIG. 3 illustrates a winch 200 forming a second embodiment of the present invention. While similar to winch 10 in function, the winch 200 incorporates two concentric elastomeric elements secured together in a series relationship between the drive shaft 206 and the drum 208. The elastomeric springs 202 and 204 are fastened together at adjoining ends through a connecting cap 210. Connecting cap 210 is free to rotate relative to both the drive shaft 206 and drum 208.

The drive shaft 206 is mounted for rotation about the axis 212 on a frame 214 by a bearing assembly (not shown) on the left side of FIG. 3 and by a bearing assembly 216 on the right in FIG. 3. A drive wheel 218, such as a gear ring, is secured to the drive shaft 206 for rotating the drive shaft. A first end ring 220 of the inner elastomeric spring 204 is rigidly bolted to an annular plate 222 on the left side of drive shaft 206. The second end ring 224 at the opposite end of the elastomeric spring 204 is rigidly bolted to a connecting cap 210. The second end ring 226 of the outer elastomeric spring 202 is also rigidly mounted to the connecting cap 210 about the second end ring 224. The first end ring 228 of the outer elastomeric spring 202 is rigidly bolted to the drum proximate the annular plate 222. Thus, the elastomeric springs 202 and 204 act in a series manner so that a given torque exerted between the drive shaft 206 and the drum 208 will induce a relative angular rotation between the springs greater than would be present with a single elastomeric spring of similar elastomeric deformation characteristics.

Preferably, the elastomeric springs 202 and 204 are designed so that a given torque exerted between the drum 208 and drive shaft 206 will deform each of the elastomeric springs an equal amount in angular deformation about the axis 212.

Figure 4:
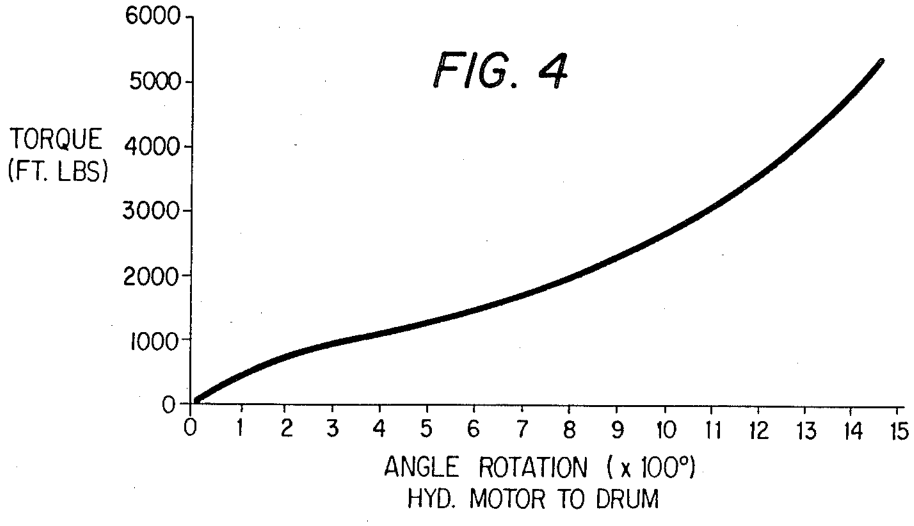
FIG. 4 is a graphic depiction of the relation between torque and angular rotation of the drive element and winch drum through the elastomeric spring.

FIG. 4 illustrates a typical graph of torque transmitted between drive shaft 206 and drum 208 as a function of the relative angular rotation of the drive shaft and drum due to torsional deformation in the elastomeric springs 202 and 204. It can been seen from FIG. 4 that this typical relationship is not a linear relationship. However, the elastomeric elements can be designed to achieve such a linear relationship if desired.

While several embodiments of the invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

I claim:

1. A winch, comprising:
   - a drum for receiving a cable, said drum having a cylindrical portion, the cable being received on the exterior of the cylindrical portion;
   - means for supporting said drum for rotation about an axis;
   - a drive element having a portion extending within the interior of the cylindrical portion of the drum;
   - means for supporting said drive element for rotation about the axis;
   - an unpreloaded cylindrical elastomeric element connected between the drum and drive element within the cylindrical portion of the drum for torsional deformation about the axis, said elastomeric element transmitting torque between the drum and drive shaft to absorb shock loading in the cable.

2. In a mooring system a winch comprising:
   - (a) a drum for receiving a cable said drum having a cylindrical portion, the cable being received on the exterior of said cylindrical portion;
   - (b) means for supporting said drum for rotation about an axis;
   - (c) a drive element;
   - (d) means for supporting said drive element for rotation about the axis; and (e) an unpreloaded elastomeric spring operably connected between said drum and said drive element for transmitting torque between said drum and said drive element through torsional deformation about a longitudinal axis of the spring and for absorbing shock loading in said cable received on said drum.

3. The winch of claim 2 further comprising means for rotating the drive element in a first selected direction about the axis to rotate the drum through the elastomeric spring to take in the cable and in a second selected direction to pay out the cable.

4. The winch of claim 3 wherein said elastomeric spring has a cylindrical configuration comprising alternating elastomeric and rigid rings to form a unitary structure, said elastomeric rings deforming in torsional shear to transmit torque between said drum and said drive element.

5. The winch of claim 2 wherein said elastomeric spring comprises a plurality of concentric cylindrical elastomeric elements connected in a series relationship.

6. The winch of claim 2 wherein said drive element has a portion extending within the interior of said cylindrical portion of said drum; and said elastomeric spring is cylindrical and connected between said drum and said drive element within said cylindrical portion of said drum.

7. The winch of claim 6 wherein said elastomeric spring is formed of an assembly of alternating elastomeric and rigid rings bonded to form a unitary structure.

8. The winch of claim 6 wherein said elastomeric spring comprises a plurality of concentric cylindrical elastomeric elements connected in a series relationship by a connecting cap mounted for rotation about the axis relative to said drum and said drive element.

9. In a mooring system a winch comprising:

(a) a drum having a cylindrical portions with radially extending walls at each end of the cylindrical portion, said drum for receiving a cable, the cable being confined on said drum by said walls, a first of said walls having an aperture therethrough open-into the interior of said cylindrical portion;

(b) a drive element having a portion extending through the aperture in said first wall into the interior of said cylindrical portion;

(c) means for supporting said drive element and said drum proximate the aperture for relative rotation about a common axis;

(d) means for mounting said drum and said drive element for rotation about an axis; and (e) an unpreloaded cylindrical elastomeric spring secured between the other wall of the drum and the portion of said drive element within said cylindrical portion of said drum for transmitting torque forces between the drive element and drum through torsional deformation of the elastomeric spring and for absorbing shock loading in said cable received on said drum.

10. The winch of claim 9 wherein said cylindrical elastomeric spring comprises alternating elastomeric and rigid rings to form a unitary structure.

11. The winch of claim 9 wherein said cylindrical elastomeric spring comprises a plurality of concentric elastomeric elements connected in a series relationship.

12. The winch of claim 11 wherein said plurality of concentrical elastomeric elements are connected in a series relationship by a connecting cap mounted for rotation about the axis relative to said drum and said drive element.

* * * * *